June 15, 1965 R. A. HATHAWAY 3,189,351

RECORD PLAYER WITH STYLUS CLEANING MEANS

Filed Jan. 19, 1962 2 Sheets-Sheet 1

INVENTOR.
Richard A. Hathaway
BY
Francis W. Crotty
Atty.

RECORD PLAYER WITH STYLUS CLEANING MEANS

Filed Jan. 19, 1962 2 Sheets-Sheet 2

INVENTOR.
Richard A. Hathaway
BY
Francis W. Crotty
Atty.

United States Patent Office
3,189,351
Patented June 15, 1965

3,189,351

RECORD PLAYER WITH STYLUS CLEANING MEANS

Richard A. Hathaway, Des Plaines, Ill., assignor to Zenith Radio Corporation, Chicago, Ill., a corporation of Delaware Filed Jan. 19, 1962, Ser. No. 167,251
3 Claims. (Cl. 274—1)

This invention relates to an automatic record player and is specifically directed to a record player having a stylus cleaning brush and provision for preventing the tone arm from "riding off" the edge of a record.

With the advent of high fidelity reproducing machines the record industry has continuously sought to improve the performance of its record discs. The accumulation of dust on records has long been a factor in impairing the fidelity of the audio system. Devices have been used in the past which attempt to clean dust or foreign matter either from the record or the record stylus.

It is an object of the present invention to provide an improved stylus cleaning brush.

Another facet of the invention solves a problem which has recently arisen in conjunction with the manufacture of records having crowned edge portions to prevent contact between the grooves of adjacent stacked records. Since the radius of records vary somewhat the stylus and its associated tone arm may "ride-off" the record if the stylus engages the crowned edge portion at its outer slope. Therefore, it is another object of this invention to prevent tone arm "ride-off."

In accordance with the above objects, the invention resides in an automatic record player for playing a record disc of a predetermined maximum radius having a tone arm bearing a stylus at one end and movable along a predetermined path from a rest position to a record tracking position. The record player also has a record changing mechanism for moving the arm and stylus along its path. The invention is an improvement in the above device comprising a rest post for supporting the tone arm during intervals in which the arm is in its rest position. The post has a cavity and is spaced to define a limiting tracking position for the stylus which is less than the maximum radius of the record disc. A stylus cleaning brush is supported in the cavity for movement between a rest position and a second position in which it is disposed in the path of movement of the stylus. Actuating means coupled to the record changing mechanism displaces the brush from its rest position to its second position in timed relation to the movement of the stylus along its path.

The features of the invention which are believed to be novel are set forth with particularity in the appended claims. The invention, together with further objects and advantages thereof, may best be understood by reference to the following description taken in connection with the accompanying drawings, in the several figures of which like reference numerals identify like elements, and in which:

Figure 1:
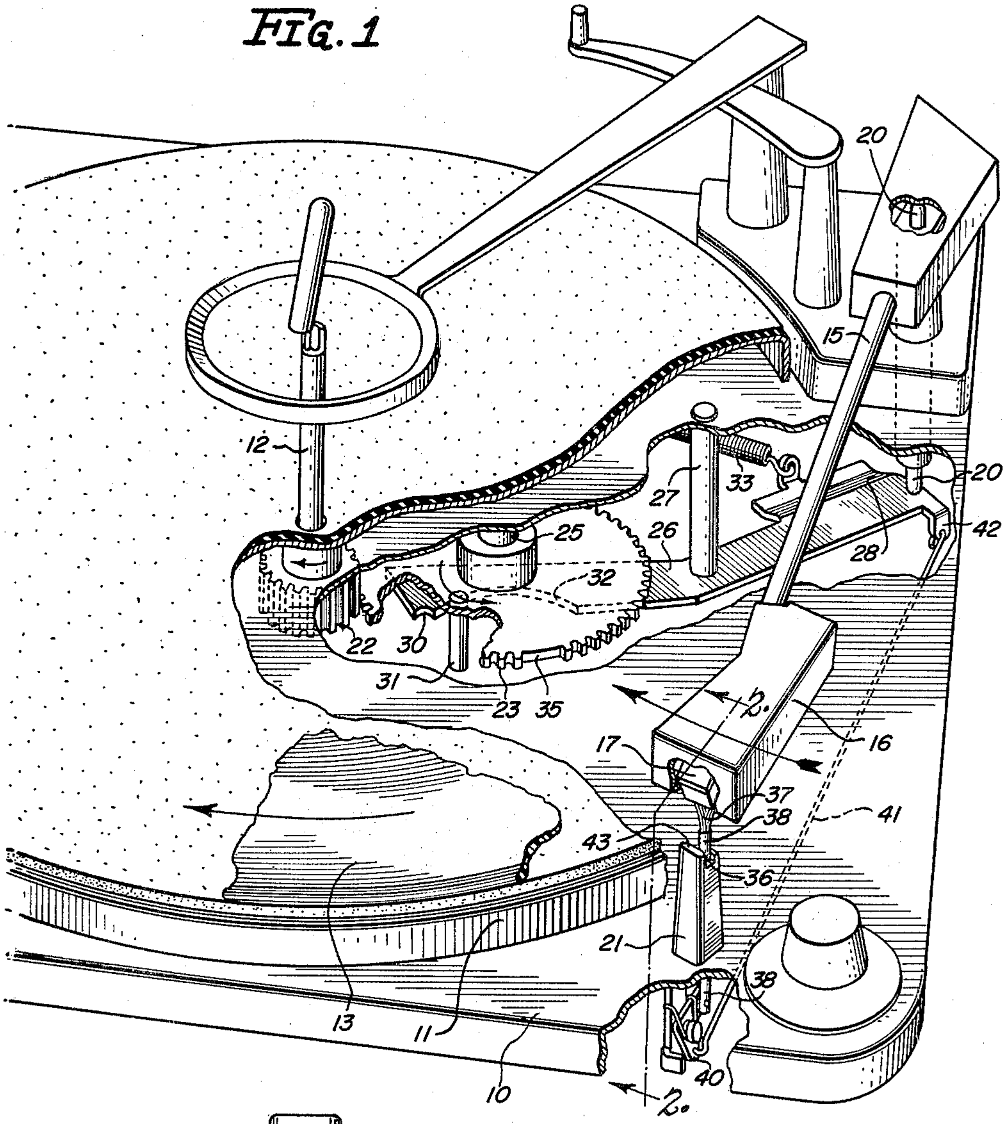
FIGURE 1 is a perspective view partially cutaway of an automatic record player embodying the present invention.
Figure 8:
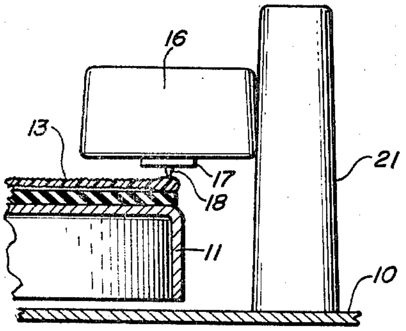
FIGURE 8 is a sectional view taken along line 8—8 of FIGURE 7.

FIGURE 1 illustrates the essential elements of an automatic record player and includes a base 10 upon which a turntable 11 is mounted for rotation. The turntable rotates about a fixed spindle 12 which centers a record disc 13 on the turntable. The illustrated record changer is capable of playing records of varying sizes up to a predetermined maximum which in this case is one having a twelve inch diameter. A tone arm 15 is pivotally mounted on base 10 and includes an essentially box shaped cartridge housing 16 containing a resiliently mounted cartridge 17 having a stylus 18 (as shown in FIGURE 8) which is suitable for tracking the grooves of a record disc.

The record player also includes a record changing mechanism for moving the tone arm and stylus along a predetermined path from a rest position to a record tracking position. A portion of this record changing mechanism is shown in the cutaway portion of FIGURE 1 and includes a tone arm lift pin 20 which moves the tone arm in a vertical plane to or from engagement with a record or with a rest post 21. The specific actuating mechanism for the lift pin includes a pinion gear 22 mounted for rotation with turntable 11, a mating clutch gear 23 rotatably mounted on a downward protruding shaft 25 which is affixed to base 10, and a lever 26 which is pivotally mounted on a downward extending stud 27 fixed to base 10. Lever 26 includes a ramp portion 28 on one end which is engageable with the end of lift pin 20, an arcuate detent 30 which is engageable with a stud 31 fixed to gear 23, and a curved guide section 32, shown mainly in dashed outline, which is biased against stud 31 by the bias force of a spring 33.

*Operation of record changing mechanism*

In normal operation when tone arm 15 is tracking a record, gear 22 is freely rotating within a mutilated section 35 of gear clutch 23. When the tone arm reaches the fast run-in grooves of the record disc a velocity trip mechanism, which is of well known design in the record player field, causes gear 22 to engage clutch gear 23 initiating rotation in a counterclockwise direction as shown by the arrow. Rotation of gear 23 moves stud 31 from its detent 30 allowing lever 26 to rotate under the influence of bias spring 33 in a counterclockwise direction. Ramp portion 28 cams lift pin 20 upwardly raising the tone arm 15 to the position shown in FIGURE 1. Further rotation of gear 23 causes stud 31 to engage guide portion 32 to reset the stud in detent 30 and to position mutilated section 35 adjacent pinion gear 22. The action of stud 31 against guide portion 32 rotates lever 26 in a clockwise direction allowing lift pin 20 to ride down ramp portion 28 thereby lowering the tone arm to either its record tracking position or its rest position on rest post 21.

Rotation of clutch gear 23 also moves tone arm 15 across the turntable in a horizontal plane. This movement is, of course, a necessary part of the record change cycle since the tone arm must move from the fast-finishing grooves of the record back to the starting grooves of the next record to be played. Furthermore, in order to prevent interference with stacked records on the spindle which must be dropped on the turntable, the tone arm is always returned to a position above the tone arm rest post as shown in FIGURE 1. The mechanism for accomplishing the horizontal movement is entirely standard and therefore has not been shown or described.

In accordance with the invention rest post 21 contains a cavity 36, the top opening of which is shown in FIGURE 1, which is of a cylindrical shape and extends substantially through the center of the rest post. The cavity supports a stylus cleaning brush 37 contained in a tubular support 38 which is freely slideable in the cavity. The brush is movable between two positions, the first being a rest position as shown in FIGURE 3 where brush 37 is entirely recessed in cavity 36 and a second position as shown in FIGURE 2 where brush 37 is fully extended from the cavity to intersect the horizontal path of movement of the tone arm stylus 18.

Actuating means are coupled to the record changing mechanism for displacing brush 37 from its rest position to its second position. More specifically, a bell crank 40 is pivotally mounted on base 10 as best shown in FIGURE 1 and has one end fixed to the lower end of tubular support 38 and its other end linked to lever 26 by a link 41. Link 41 is coupled to lever 26 at the end which engages lift pin 20 by a tab 42.

*Operation of stylus cleaning brush*

Figures 2, 3, 4, 5, 6, 7:
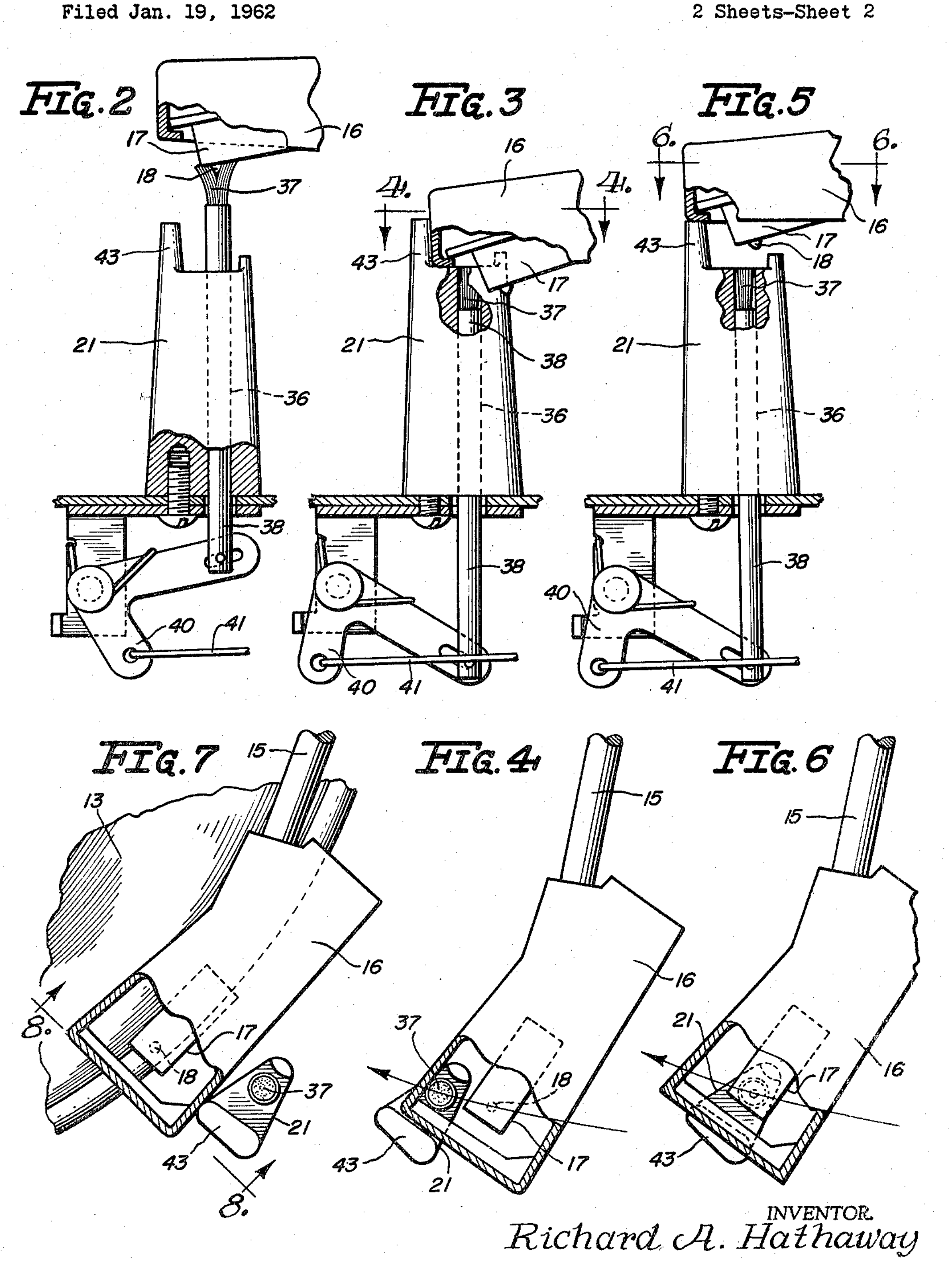
FIGURE 2 is a partial sectional view taken along line 2—2 of FIGURE 1 showing a tone arm and rest post.
FIGURE 3 is similar to FIGURE 2 showing a different operating position of the tone arm.
FIGURE 4 is a partial sectional view taken along line 4—4 of FIGURE 3.
FIGURE 5 is similar to FIGURE 2 showing the tone arm in yet another position.
FIGURE 6 is a partial sectional view taken along line 6—6 of FIGURE 5.
FIGURE 7 is a plan view partially cutaway of a portion of FIGURE 1 showing the tone arm in contact with a record disc.

During intervals in which the record player is not in use, tone arm 15 is in its rest position on tone arm rest post 21 as shown in FIGURES 3 and 4. Since the tone arm is in a vertically lowered position, lever 26 is in a clockwise rotated position allowing lift pin 20 to rest on the lower portion of ramp 28. Link 41 has rotated bell crank 40 to its extreme clockwise position as shown in FIGURE 3 thereby lowering brush 37 within cavity 36. It should be noted in FIGURE 4 that stylus 18 in its rest position is radially farther from record disc 13 compared to brush 37.

At the start of the record change cycle gear 23 is rotated thereby rotating lever 26 and camming lift pin 20 upwardly. Since brush 37 is coupled to lever 26 by link 41, the brush is extended upwardly out of its cavity concurrently with the vertical movement of tone arm 15. Thus, when the tone arm begins its horizontal travel to position itself over the starting grooves of a record, brush 37 engages stylus 18 as shown in FIGURE 2 removing any foreign matter from the stylus. When the tone arm descends into engagement with a record, brush 37 also descends into its cavity. The tone arm stylus is again cleaned after the record disc has been played since the tone arm must move past the brush to position itself above its rest position to await the dropping of another record on the turntable. Therefore, the stylus is cleaned twice for each record played, brush 37 being extended out of its cavity in timed relation to the movement of stylus 18 along its path of movement during the change cycle operation.

If the tone arm is manually placed on the record, means are provided for preventing the user from damaging the stylus by striking it against the tone arm rest post. This is illustrated in FIGURES 5 and 6 where the tone arm rest post has a stepped portion 43 which engages a lower portion of cartridge housing 16 to prevent contact of stylus 18 with post 21.

In addition to supporting stylus brush 37, rest post 21 serves to arrest radial displacement of the tone arm by virtue of its location on base 10. More particularly post 21 is spaced on base 10 to define a limiting tracking position for stylus 18 which is less than the radius of record 13. As best shown in FIGURES 7 and 8, stylus 18 is in contact with the starting grooves of record 13 at the same time that the cartridge housing 16 is in contact with rest post 21 which limits radial movement of stylus 18 towards the edge of record disc 13. As mentioned above almost all records are now manufactured with a crowned edge portion in order to prevent contact between the grooves of two adjacent records arranged in a stack. Due to tolerance variations in the record disc or in the record changer set down mechanism, the stylus may contact the outer sloping edge of the crown causing the tone arm to ride-off the record. In such a case both the stylus and the record may be damaged. Placement of tone arm rest post 21 from record disc 13 at a distance less than the distance from stylus 18 to the sidewall of cartridge housing 16 which contacts post 21 prevents any accidental ride-off of the tone arm.

Thus, the present invention provides an improved automatic record player which prevents tone arm ride-off and has an improved stylus cleaning device.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. In an automatic record player for playing a record disc of a predetermined maximum radius having a tone arm bearing a stylus at one end and movable along a predetermined path from a rest position to a record tracking position and further having a record changing mechanism for moving said arm and stylus along said path, the improvement comprising:

a rest post for supporting said tone arm during intervals in which said arm is in said rest position, said post having a cavity and spaced to define a limiting tracking position for said stylus which is less than said maximum radius;

a stylus cleaning brush supported in said cavity for movement between a rest position and a second position in which said brush is disposed in the path of movement of said stylus;

and actuating means coupled to said record changing mechanism for displacing said brush from said rest position to said second position in timed relation to the movement of said stylus along said path.

2. In an automatic record player having a tone arm bearing a stylus at one end and movable along a predetermined path from a rest position to a record tracking position and further having a record changing mechanism for moving said arm and stylus along said path, the improvement comprising:

a rest post for supporting said tone arm during intervals in which said arm is in said rest position and having a cavity;

a stylus cleaning brush supported in said cavity for movement between a rest position and a second position in which said brush is disposed in the path of movement of said stylus;

and actuating means coupled to said record changing mechanism for displacing said brush from said rest position to said second position in timed relation to the movement of said stylus along said path and during that part of the record change cycle in which said tone arm travels along said path from said rest position to said tracking position.

3. In an automatic record player having a tone arm bearing a stylus at one end and movable along a predetermined path from a rest position to a record tracking position and further having a record changing mechanism for moving said arm and stylus along said path, the improvement comprising:

a rest post for supporting said tone arm during intervals in which said arm is in said rest position and having a cavity;

a stylus cleaning brush supported in said cavity for movement between a rest position and a second position in which said brush is disposed in the path of movement of said stylus;

and actuating means coupled to said record changing mechanism for displacing said brush from said rest position to said second position in timed relation to the movement of said stylus along said path, said actuating means maintaining said brush in said second position during operating intervals in which said tone arm traverses said path.

(References on following page)

References Cited by the Examiner

UNITED STATES PATENTS

| | | | |
|---|---|---|---|
| 2,114,881 | 4/38 | Kleber | 274—23.2 |
| 2,554,347 | 5/51 | Rouse | 274—13.1 |
| 2,685,447 | 8/54 | Ristan et al. | 274—1 X |
| 2,900,192 | 8/59 | Mueller | 274—15 |
| 2,955,825 | 10/60 | Staar | 274—1 |

FOREIGN PATENTS

| | | |
|---|---|---|
| 646,593 | 11/50 | Great Britain. |

NORTON ANSHER, *Primary Examiner.*

ALDRICH F. MEDBERY, *Examiner.*